(12) United States Patent
Knispel

(10) Patent No.: US 8,863,797 B2
(45) Date of Patent: Oct. 21, 2014

(54) WINTER TIRE TREAD SIPING PATTERN

(75) Inventor: Oliver Knispel, Gelnhausen-Hailer (DE)

(73) Assignee: The Goodyear Tire & Rubber Company, Akron, OH (US)

(*) Notice: Subject to any disclaimer, the term of this patent is extended or adjusted under 35 U.S.C. 154(b) by 1002 days.

(21) Appl. No.: 12/915,090

(22) Filed: Oct. 29, 2010

(65) Prior Publication Data

US 2012/0103492 A1 May 3, 2012

(51) Int. Cl.
*B60C 11/11* (2006.01)
*B60C 11/12* (2006.01)
*B60C 11/03* (2006.01)

(52) U.S. Cl.
CPC ..... *B60C 11/1204* (2013.04); *B60C 2011/1231* (2013.04); *B60C 11/0302* (2013.04); *B60C 11/1263* (2013.04); *B60C 2011/1213* (2013.04); *B60C 2011/1245* (2013.04); *Y10S 152/03* (2013.01)
USPC ............. 152/209.22; 152/209.28; 152/DIG. 3

(58) Field of Classification Search
USPC ............................ 152/209.22, 209.28, DIG. 3
See application file for complete search history.

(56) References Cited

U.S. PATENT DOCUMENTS

| 4,574,856 | A |  | 3/1986 | Graas | 152/209 |
|---|---|---|---|---|---|
| 5,435,366 | A | * | 7/1995 | Voigt et al. | 152/209.28 |
| 2006/0151078 | A1 | * | 7/2006 | Colombo et al. | 152/DIG. 003 |

FOREIGN PATENT DOCUMENTS

| EP | 330644 | A | * | 8/1989 | |
|---|---|---|---|---|---|
| EP | 775600 |  |  | 5/1997 | ............. B60C 11/12 |
| JP | 6127218 |  |  | 5/1994 | ............. B60C 11/04 |
| JP | 10-244813 | A | * | 9/1998 | |
| JP | 2003-146023 | A | * | 5/2003 | |
| JP | 2005-193815 | A | * | 7/2005 | |
| WO | 2004/056588 | A1 |  | 7/2004 | ............. B60C 11/11 |

OTHER PUBLICATIONS

Machine translation for Japan 10-244813 (no date).*
Machine translation for Japan 2003-146023 (no date).*
Machine translatioin for Europe 330644 (no date).*
Machine translation for Japan 2005-193815 (no date).*
European Search Report completed Feb. 10, 2012.

* cited by examiner

*Primary Examiner* — Steven D Maki
(74) *Attorney, Agent, or Firm* — Richard B. O'Plalnick

(57) ABSTRACT

A vehicle wheel tire includes a tire tread having a circumferential center tread region in which block elements are arranged in a symmetric pattern on opposite sides of a tire circumferential equatorial centerplane. Symmetrically disposed block elements on opposite sides of the centerplane have a plurality of spaced apart and laterally extending wavy sipes extending across the block element. Selective pairs of adjacent sipes are interconnected by one or more circumferentially oriented notches. The wavy sipes have regions of varying depth and include one or more recessed region(s) and one or more non-recessed region(s). A circumferentially disposed notch interconnecting a pair of adjacent wavy sipes at opposite notch ends intersects the wavy sipes at non-recessed sipe regions.

9 Claims, 11 Drawing Sheets

WINTER TIRE TREAD SIPING PATTERN

FIELD OF THE INVENTION

The invention relates generally to vehicle tires and, more specifically, to a center tread pattern for tires of a winter type.

BACKGROUND OF THE INVENTION

Winter tires constructed for winter driving conditions are intended to be suitable for running on surfaces of reduced compactness such as snow-covered roadways. Such tires are required to demonstrate suitable traction (gripping), power, braking, and handling characteristics while demonstrating good dry road, wear, and noise level performance. The tread pattern of winter tires must meet such competing objectives in order to provide the user with acceptable tire performance.

SUMMARY OF THE INVENTION

According to an aspect of the invention, a vehicle wheel tire includes a tire tread having a circumferential center tread region in which block elements are arranged in a symmetric pattern on opposite sides of a tire circumferential equatorial centerplane. Symmetrically disposed block elements on opposite sides of the centerplane have a plurality of spaced apart and laterally extending wavy sipes extending across the block element. Selective pairs of adjacent sipes are interconnected by one or more circumferentially oriented notches.

In a further aspect, the opposite lateral sides of the center tread region are bounded respectively by a circumferential groove the sole circumferential groove within a respective half of the tire tread.

Pursuant to a further aspect, the notches within the tire tread are confined to the center tread region. The notches within each of the block elements are substantially linear and are mutually non-aligned in the circumferential direction.

The adjacent pair of interconnected wavy sipes, in another aspect, have regions of varying depth and include one or more recessed region(s) and one or more non-recessed region(s). The circumferentially disposed notch interconnecting a pair of adjacent wavy sipes at opposite notch ends intersects the wavy sipes at non-recessed sipe regions.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
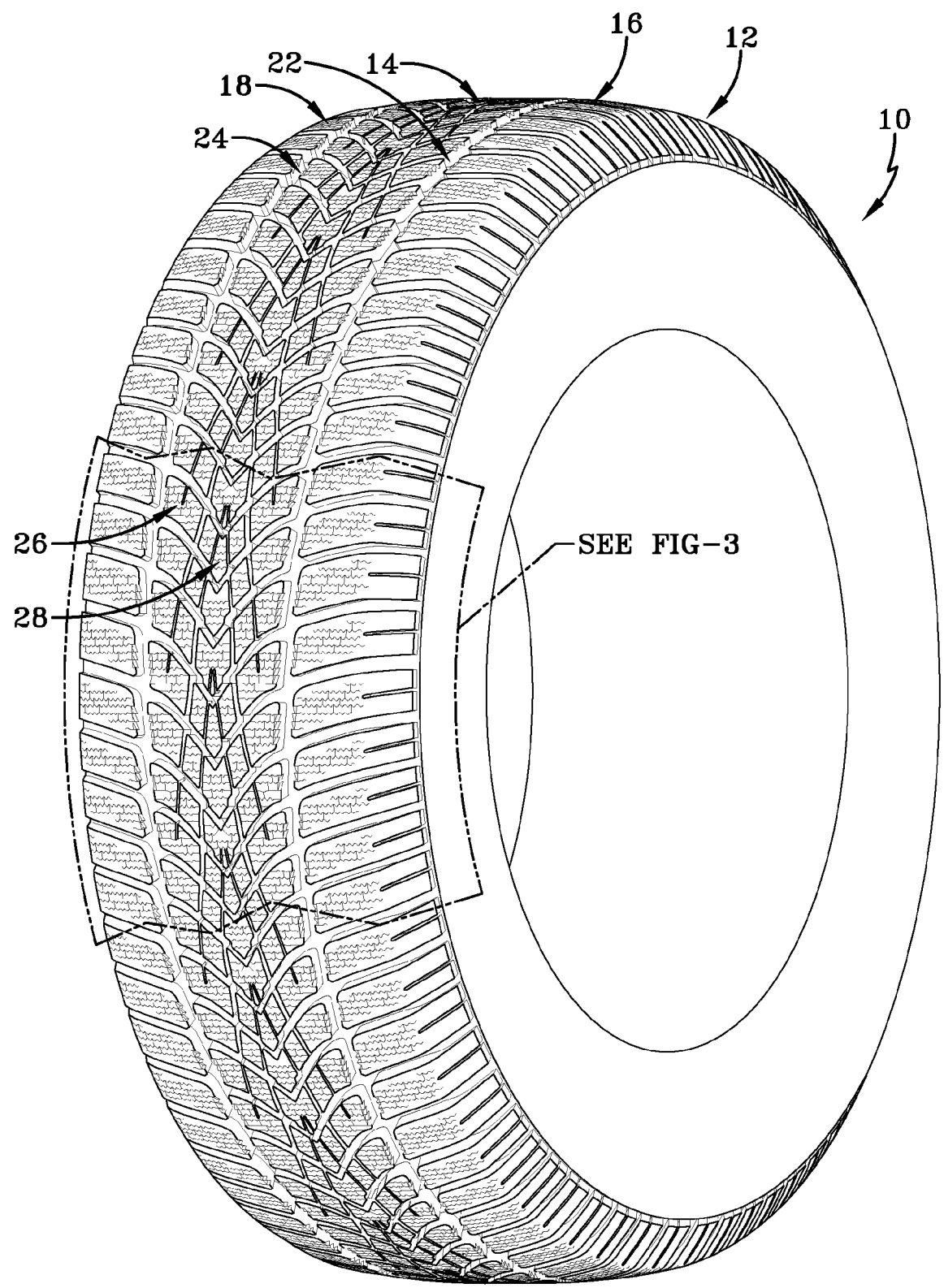
FIG. 1 is a isometric view of a tire including a tire tread.
Figure 2:
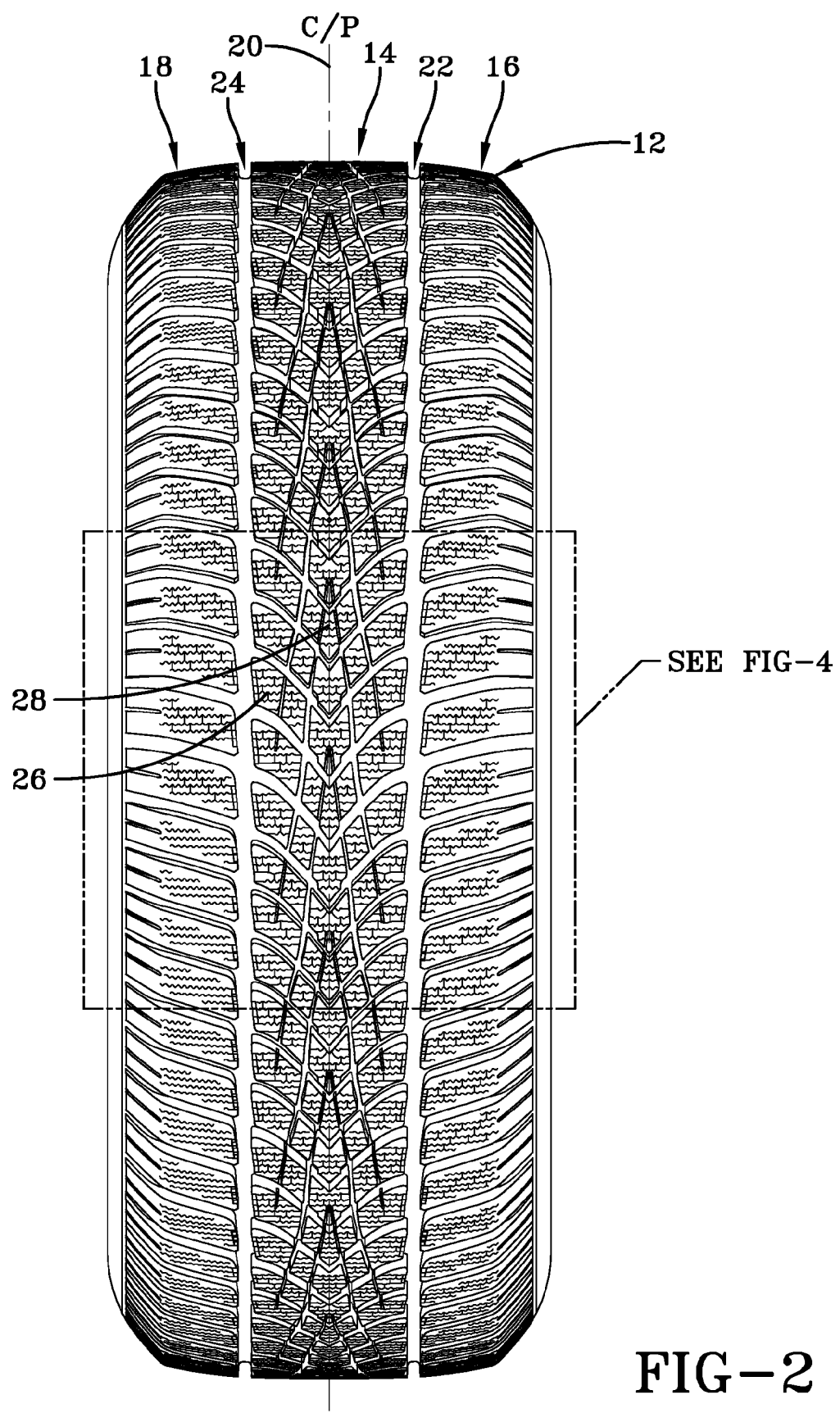
FIG. 2 is a plan view of the tire tread.
Figure 3:
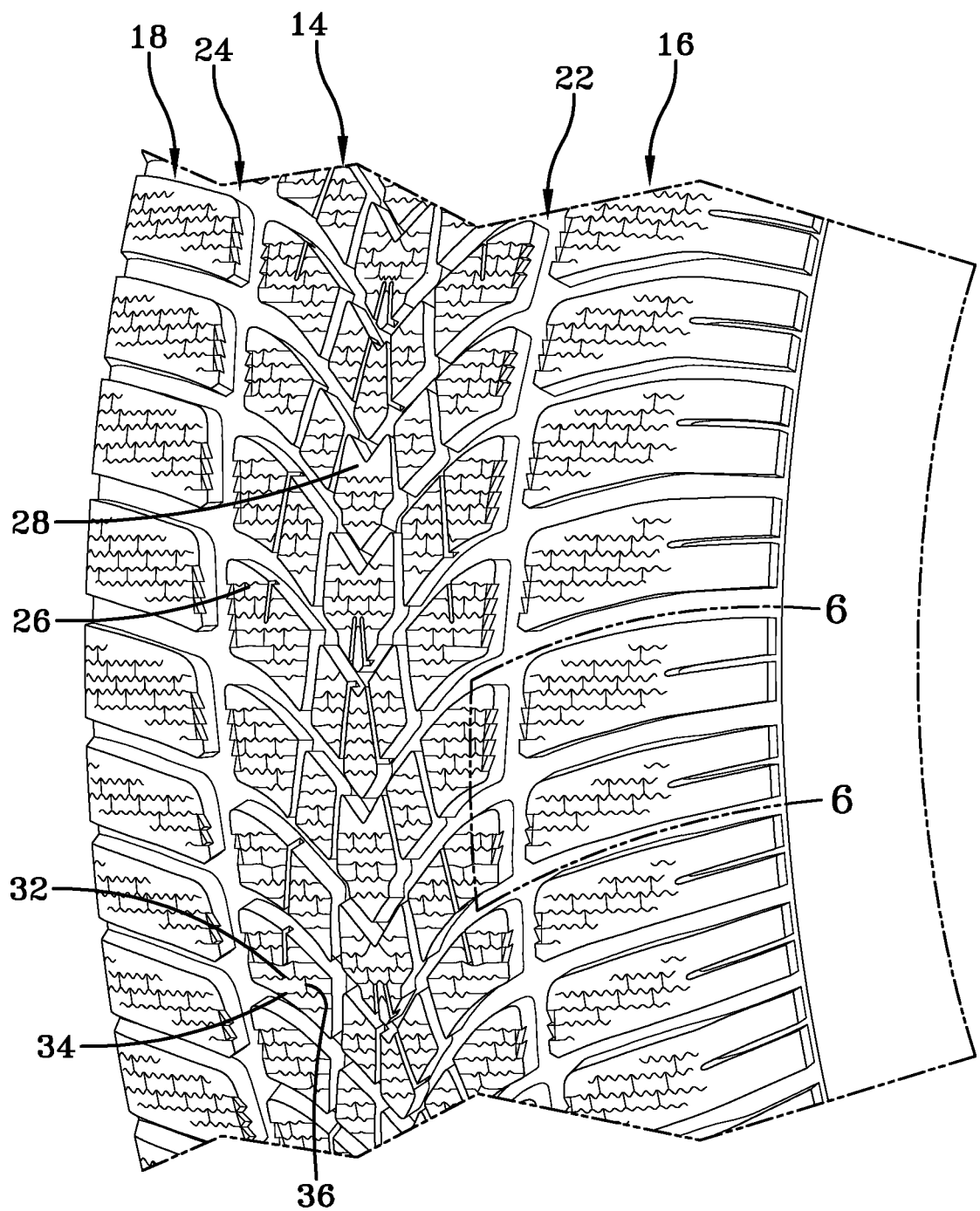
FIG. 3 is an enlarged isometric view of a tread portion identified in FIG. 1.
Figure 4:
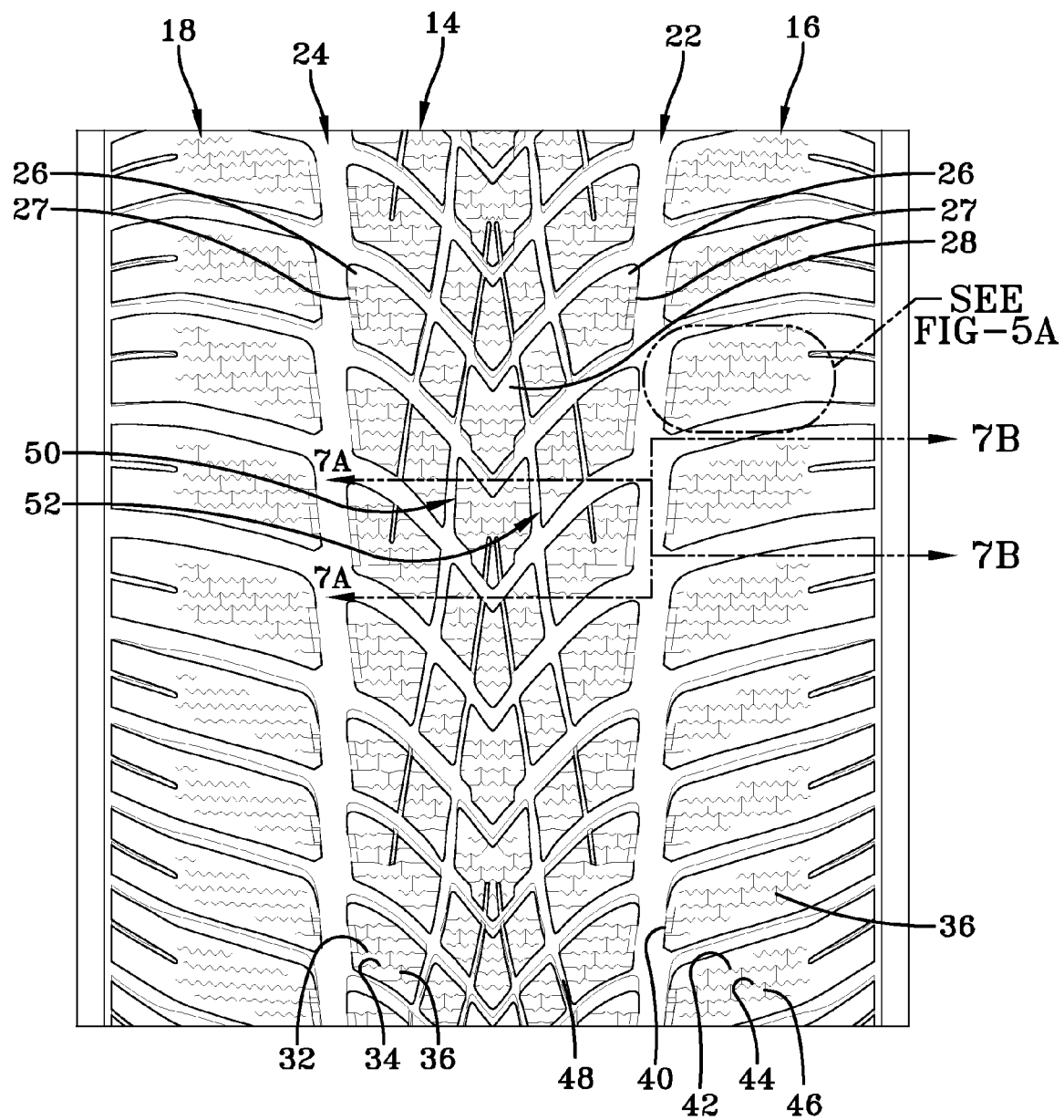
FIG. 4 is an enlarged isometric view of a tread portion identified in FIG. 2.

With initial reference to FIGS. 1, 2, 3, and 4, a tire 10 is provided having a circumferential tread 12. The tread 12 includes a circumferential center tread region 14 and two shoulder tread regions 16, 18 on opposite sides of center region 14. A tire equatorial centerplane 20 divides the tread 12 into two symmetrical halves. A pair of circumferential grooves 22, 24 bound the center tread region 14, separating the center region from opposite shoulder tread regions 16, 18.

Figure 5A:
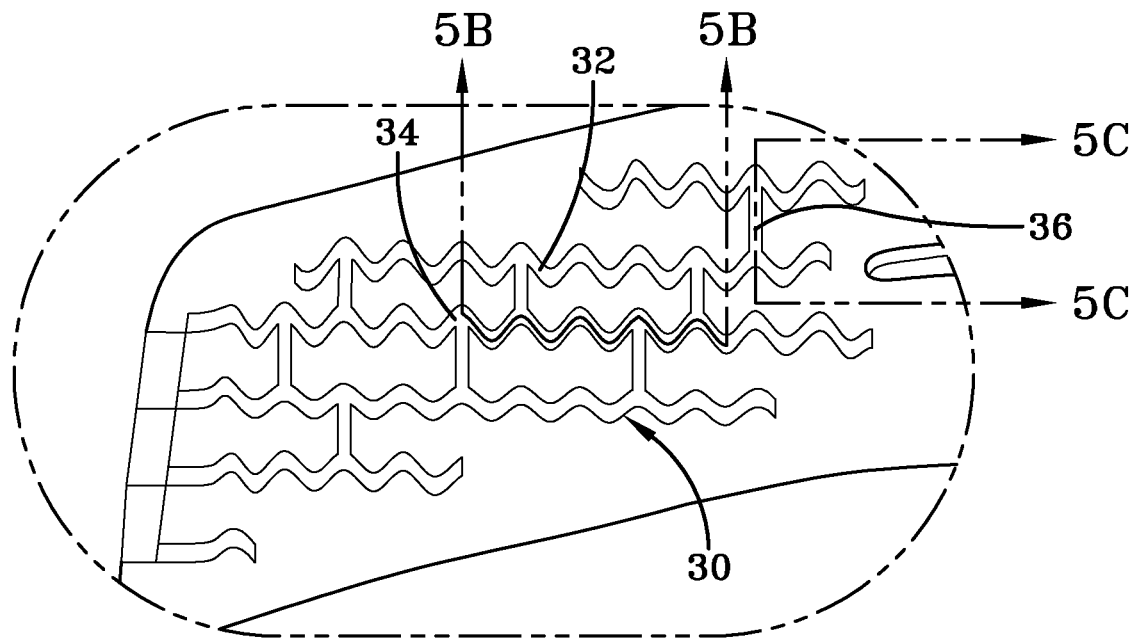
FIG. 5A is an enlarged view of the siping and notch pattern in center tread blocks.

In the symmetrical pattern of the tread 12 shown, the center region 14 includes off-center block elements 26 of sundry geometric shape on opposite sides of the centerplane 20, outer off-center block elements 26 having a groove-facing side 27 that borders a respective circumferential groove 22 or 24. The center region 14 further includes interior on-center block elements 28 of sundry geometric configuration located generally on the circumferential centerplane 20. Some or all of the center region block elements, including selective on-center blocks 28 and off-center blocks 26, include multiple sinusoidal or wavy sipes 30 that run in a mutually spaced apart and parallel orientation laterally across a respective block element. Sipes 30 are generally of a wavy, undulating, or sinusoidal configuration having a variable depth in the lengthwise direction that varies from deeper recessed sipe portions to sipe portions that are not recessed as will be explained below. Adjacent pairs of laterally extending wavy sipes 32, referred for illustration generally as sipes 32, 34, are interconnected by one or more circumferentially extending notches 36. The notches 36 are generally of linear straight-side constant depth configuration, extending circumferentially to interconnect a pair of adjacent wavy sipes at a medial sipe intersection location as shown in FIG. 5A.

The shoulder tread regions 16, 18 are formed by block elements 38 having an axially inward facing side 40 adjoining a respective circumferential tread groove 22, 24. The shoulder block elements 38 may at the user's election include multiple sinusoidal or wavy sipes 42, 44 configured similarly to the sipes 30 of the center region 14. The shoulder sipes 42, 44 likewise run in a mutually spaced apart and parallel orientation laterally across a respective shoulder block element and have a variable depth in the lengthwise direction that varies from deeper recessed sipe portions to sipe portions that are not recessed. The adjacent wavy sipes 42, 44 are interconnected by one or more circumferentially extending notches 46. The notches 46 are generally of linear straight-side constant depth configuration, extending circumferentially to interconnect a pair of adjacent wavy sipes at a medial sipe intersection location.

Figure 8:
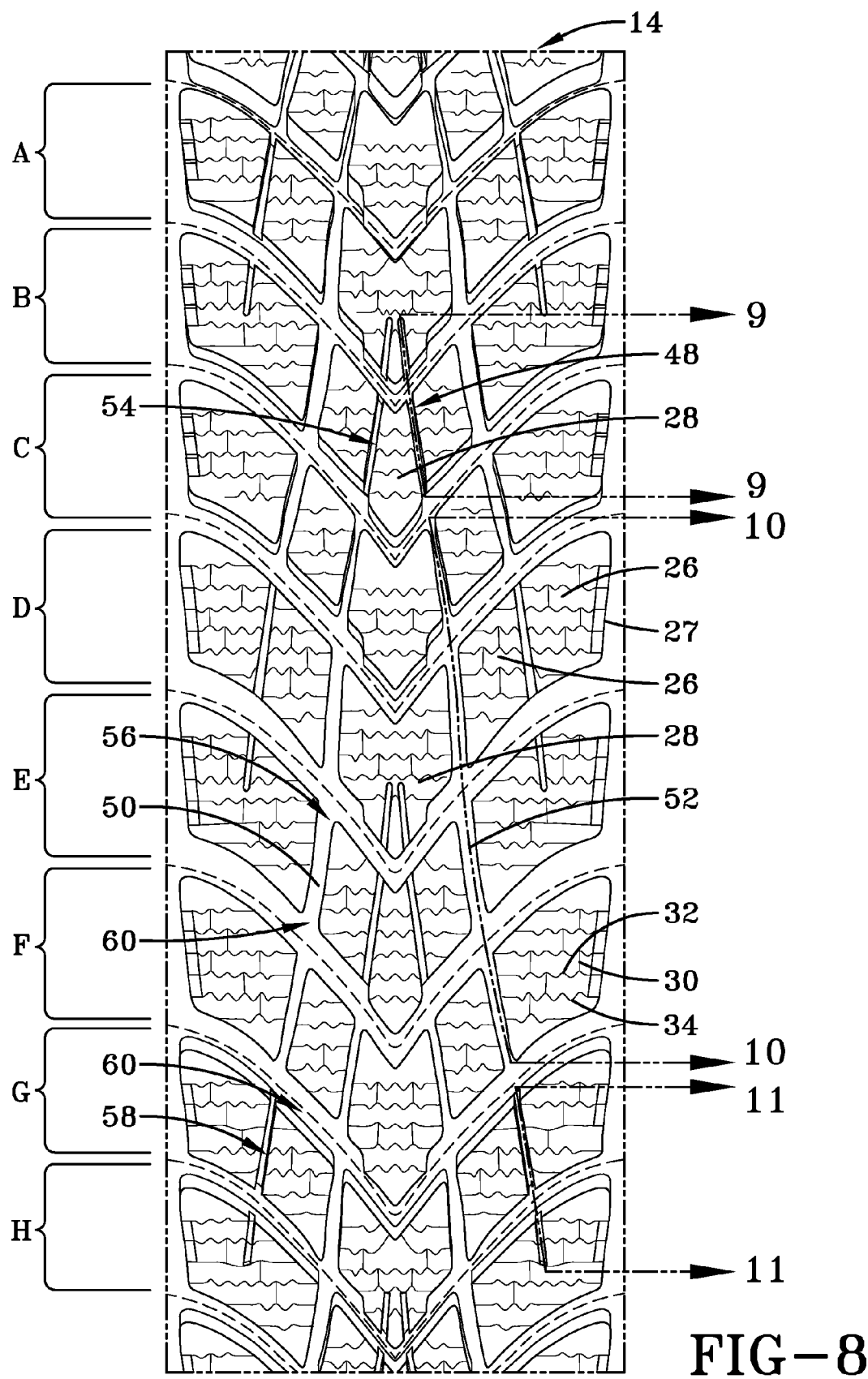
FIG. 8 is a plan view of a portion of the tread center region.

Referring to FIGS. 4, 8, 9, 10, and 11, a circumferential array of spaced apart first V-grooves on the tread centerplane 20. Each of the first V-grooves includes divergent first groove arm 50 and second groove arm 52. Each of the groove arms 50, 52 have a vertex segment 54, a medial segment 56, and a terminal segment 58. The groove arms 50, 52 are of variable width and depth from the vertex segment 54 to the medial segment 56, to the terminal segment 58. The depth of the groove arms 50, 52 are shallowest at the segments 54, 58 and deepest at the medial segment 56. The width of the groove arms 50, 52 is narrowest at the segments 54, 58 and widest at the medial segment. The ends of the groove arms 50, 52 converge but do not meet in the vertex region of each arm as shown in FIG. 8.

Figure 10:
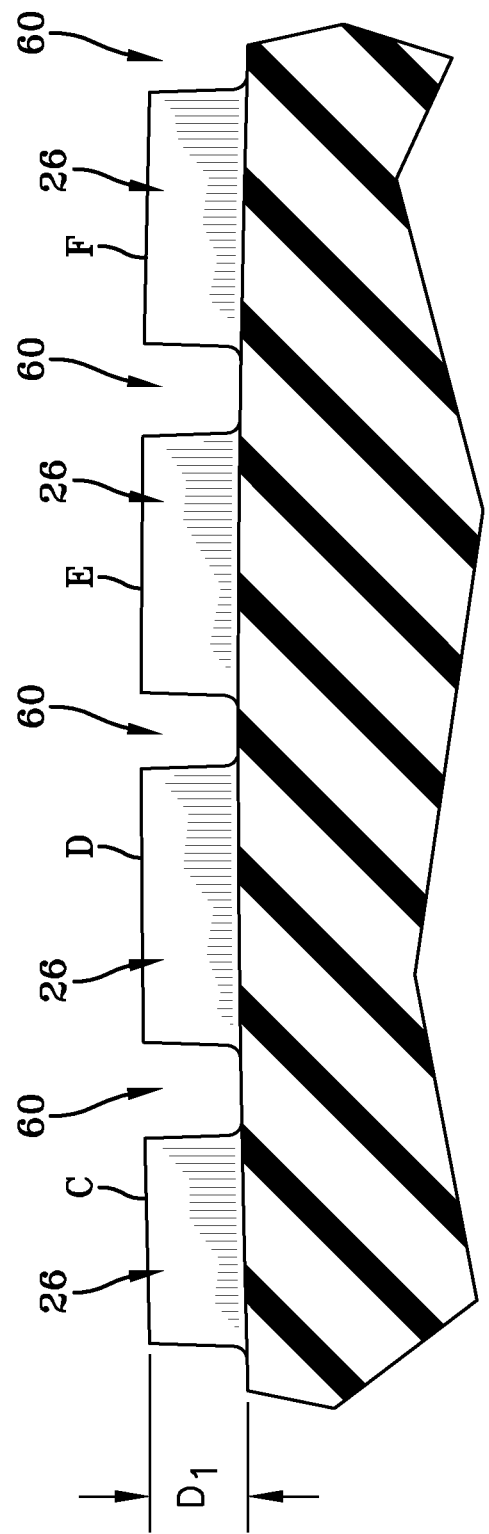
FIG. 10 is a partial section view through the tread center region taken along the line 10-10 of FIG. 8.

A circumferential array of spaced apart second, smaller dimensioned, V-grooves 60 extend about the tread center region symmetric with the centerplane 20. Each of the second V-grooves 60 within the array is oriented in an opposite circumferential direction from the array of first V-grooves 48 on the tread centerplane 20. Each of the second V-grooves 60 include divergent groove legs extending from a vertex segment and each groove 60 is generally semi-circular in section and preferably at a constant depth along the groove. FIG. 10 illustrates in section the configuration of second V-grooves 60 within regions C, D, E, F as those regions are identified in FIG. 8.

Figure 9:
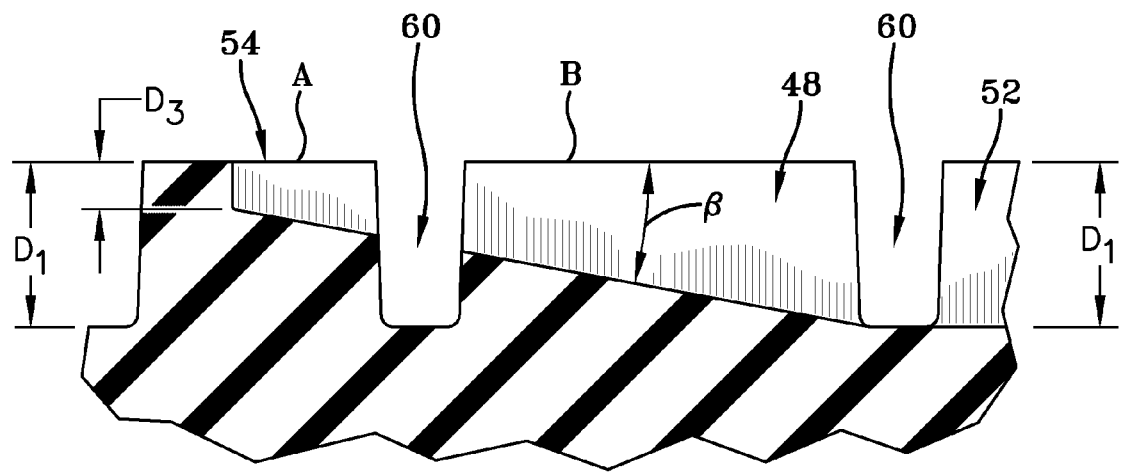
FIG. 9 is a partial section view through the tread center region taken along the line 9-9 of FIG. 8.
Figure 11:
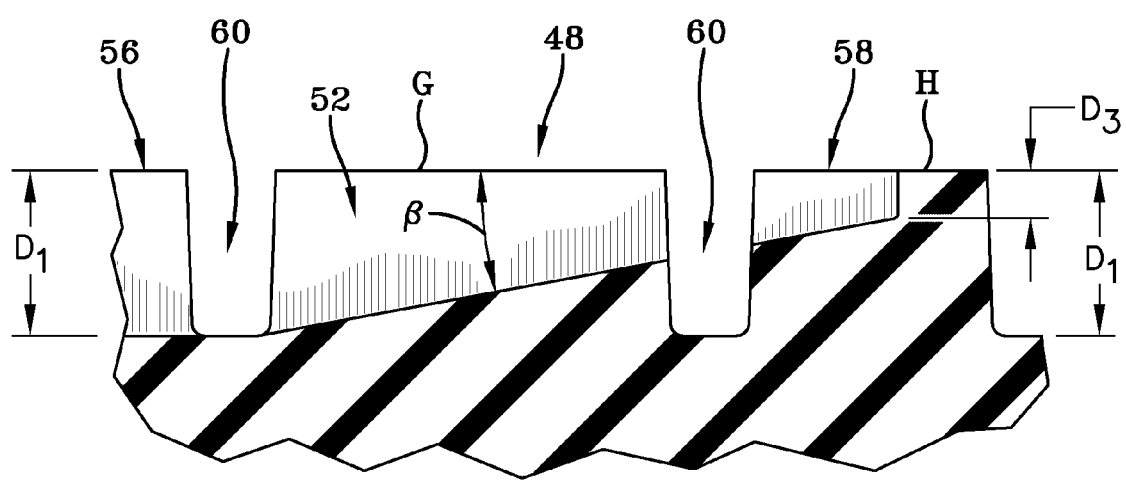
FIG. 11 is a partial section view through the tread center region taken along the line 11-11 of FIG. 8.

The repeating circumferential array of first V-shaped grooves positioned on the centerplane overlap the array of second V-shaped grooves in such a way that one first V-groove 48 is overlapped by about 6 to 9 second V-grooves 60. FIG. 8 illustrates the center tread region 14 broken into regions A through H for illustration purposes. FIG. 9 shows the first V-groove 48 arm configuration within region A of the center tread (FIG. 8), that being the vertex segment 54 of the arms 50, 52. It will be appreciated as shown that the first V-groove arms 50, 52 have a varying lengthwise depth that varies between about 2 and 7 millimeters from a shallower depth D3 at the vertex arm segment 54 to an increased depth D1 at the medial arm segment 56 back to a decreased depth D3 at the terminal arm segment 58. The shallow depth D3 at arm segments 54, 58 is approximately 2 millimeters. The groove 48 deepens at an angle β of approximately 45 degrees through regions B, C of FIG. 8 to a maximum depth of 7 millimeters in the medial segment 56 of the groove arms represented by regions D, E in FIG. 8. From medial section 56, the groove arm depth inclines (regions F, G, H of FIG. 8) back to a depth D3 of 2 millimeters at the terminal arm end 58 as shown in FIG. 11.

In addition to the variable depth within the first V-grooves 48, the width of the first V-groove arms 50, 52 varies between the vertex segment 54, medial segment 56, and terminal segment 58. The arms 50, 52 of each V-groove 48 at the vertex and terminal ends is narrower, approximately 1 to 3 millimeters. In the medial segment 56, the groove arms 50, 52 widen to 3 to 8 millimeters or generally two times the minimum width at the ends. As the arms 50, 52 of each first V-groove 48 are deep and small in width at the vertex and terminal ends and become shallower but broader in the middle, the containment volume of the groove arms per length unit remains constant.

Referring to FIGS. 3, 6, 7A, and 7B, the off center block elements 26 have along an upper edge 63 of the side 27 a series of saw-teeth 62 of generally right triangular sectional configuration. Each of the saw-teeth 62 are inclined along surface 64 at an angle α of approximately 45 degrees to intersect surface 66. Adjacent saw-teeth meet at intersection 68. On the opposite side of the grooves 22, 24, the shoulder lugs 38 likewise have a series of saw-teeth 76 that are directed into a respective groove. The shoulder lug saw-teeth 76 are inclined at angle α in an opposite radial direction as the saw-teeth 62. Saw-teeth 76 include inclined surface 78 which meets tooth side 80. Adjacent saw-teeth 76 meet at intersection 82. The inclination angle of teeth 62, 76 is approximately 45 degrees. The saw-teeth 62, 76 are approximately 2 to 3 mm in depth D2 and are spaced apart a distance W of approximately 5 millimeters. The saw-teeth 62, 76 are inclined in the radial direction with the inclination of teeth on one side of the groove being in the opposite radial direction than on the other side of the groove 22, 24. The opposite radial inclination of the saw-teeth on opposite sides of the grooves acts to increase grip on snow surfaces. The number of the saw-teeth is preferably the same as the number of the lateral, preferably wavy sipes in the respective tread block. The saw-teeth are preferably also aligned with respect aligned at intersections 68, 82 with respective wavy sipes extending across each block.

Figure 5B:
FIG. 5B is a section view through a sipe taken along the line 5B-5B of FIG. 5A.
Figure 5C:
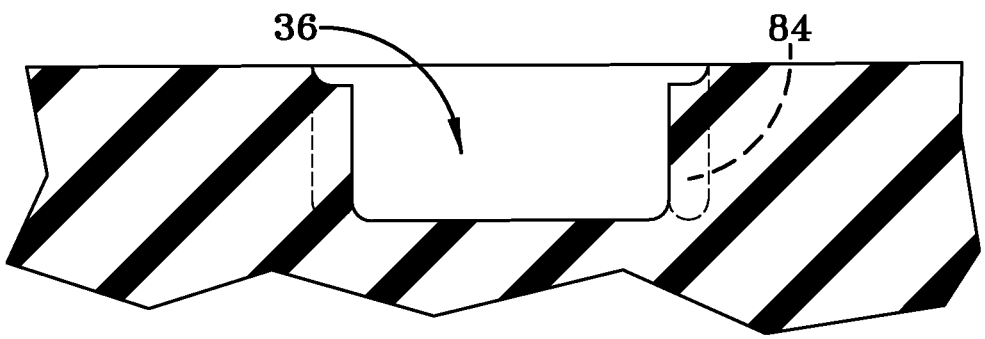
FIG. 5C is a section view through a notch taken along the line 5C-5C of FIG. 5A.
Figure 6:
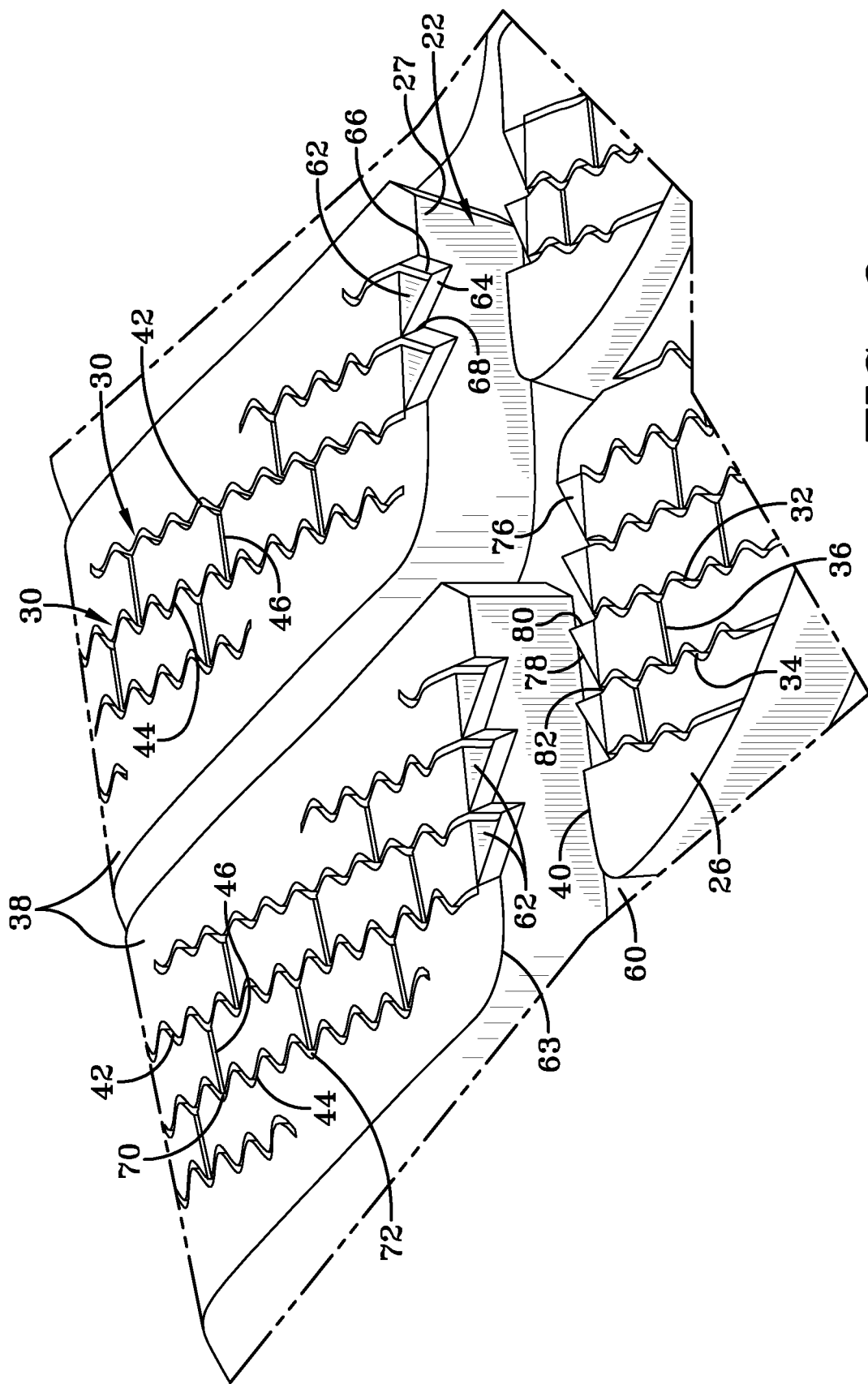
FIG. 6 is a partial perspective view of a tread portion taken along the line 6-6 of FIG. 3.
Figure 7A:
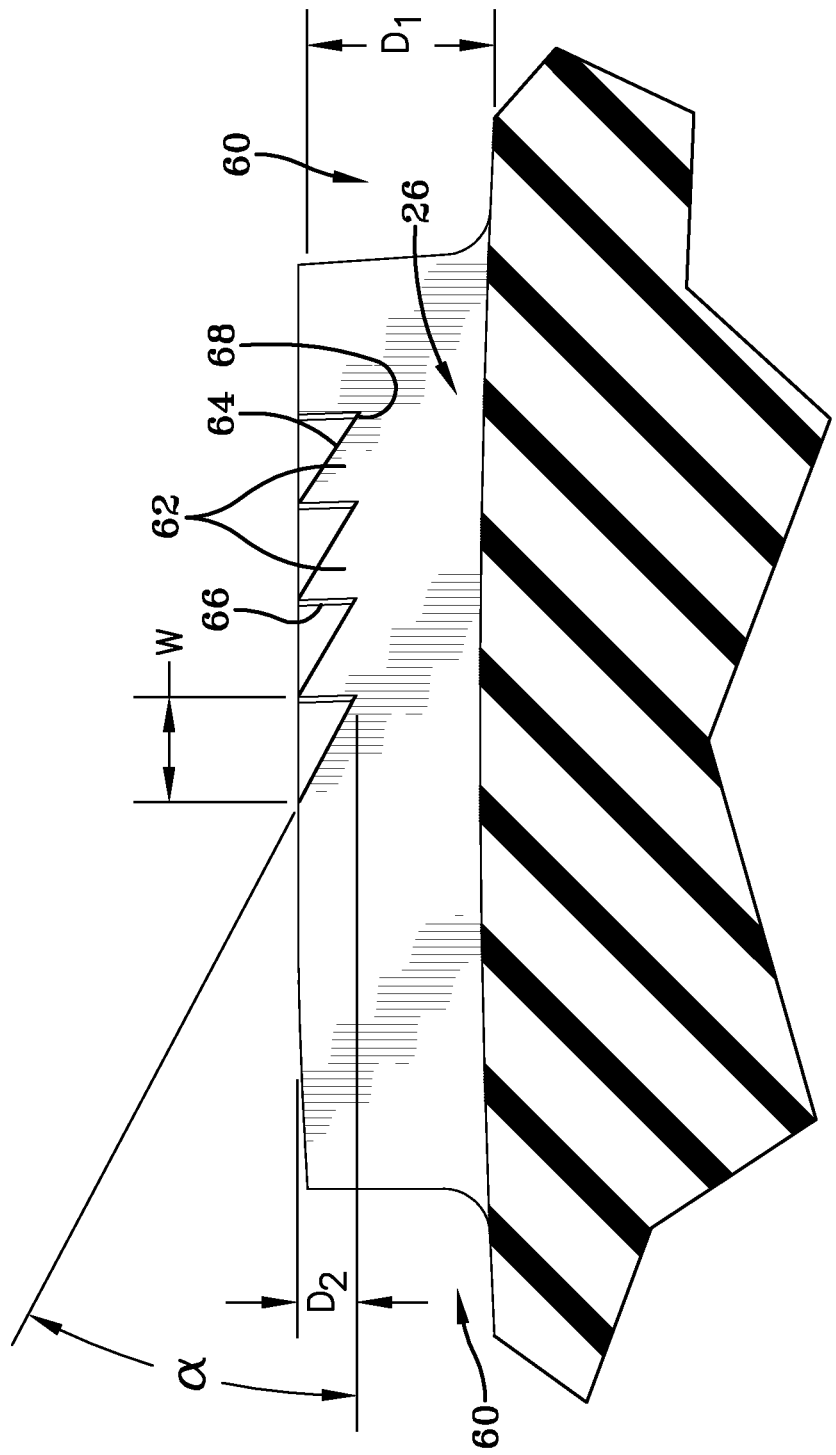
FIG. 7A is a partial section view of a tread portion taken along the line 7A-7A of FIG. 4.
Figure 7B:
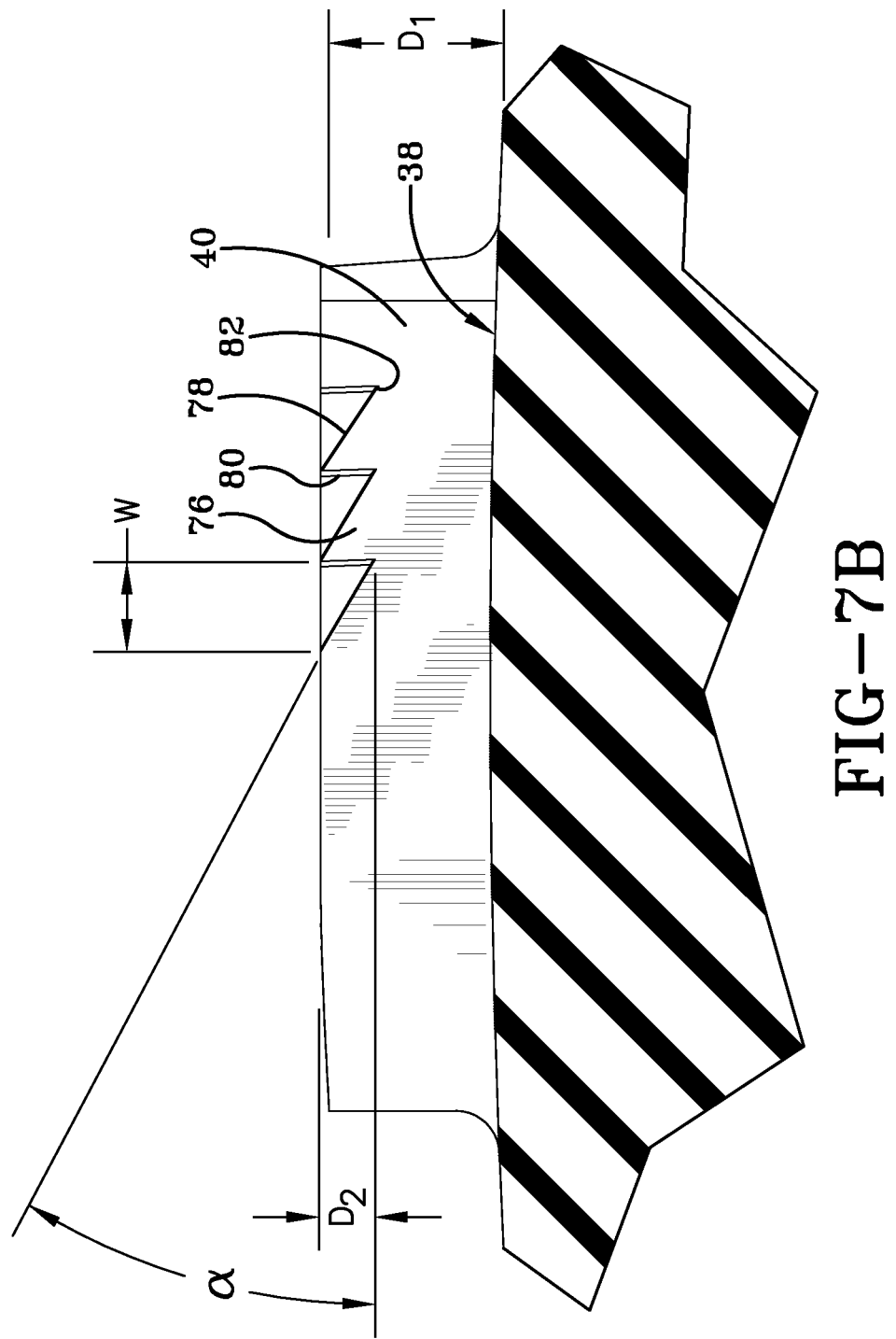
FIG. 7B is a partial section view of a tread portion taken along the line 7B-7B of FIG. 4.

With continued reference to FIGS. 3, 5A, 5B, 5C, 6, 7A, and 7B, adjacent wavy sipes in the center and shoulder tread blocks extend in a generally axial lateral direction and may be connected by one or more circumferential notches. The notches 36 (center tread region) and 46 (shoulder blocks) are generally rectangular in section and of a constant depth as shown by FIG. 5C. The wavy sipes 30 (center tread region blocks) and 42, 44 (shoulder blocks) have a sectional configuration shown in FIG. 5B. Straight circumferentially oriented notches 36, 46 interconnect adjacent axially oriented wavy sipes 30, 42, 44. Included in the sipe configuration are semi-circular shaped cuts or recesses 84. The recesses 84 are located such that the notches 36 interconnect a pair of adjacent wavy sipes at opposite notch ends 70, 72 at non-recessed sipe regions rather than at the recessed regions 84. In so doing, the notches meet the sipes at locations where there is no recess 84. The depth of the notch and the sipes intersected thereby is generally the same as shown by FIGS. 5B and 5C.

As can be seen from FIGS. 5A through 5C, a pair of bottom raising elements is provided in the sipe at each intersection of the notch and the sipe, the bottom raising elements defining a recess having substantially the same width as the width of the notch. From the foregoing, it will be appreciated that the vehicle wheel tire includes a tire tread 12 having a circumferential center tread region 14 in which block elements (e.g. 26, 28) are arranged in a symmetric pattern on opposite sides of a tire circumferential equatorial centerplane 20. The advantage of a symmetrically configured tire tread to a user is to simplify orientation and positional issues in the mounting of the tire to a vehicle. The symmetrically disposed block elements on opposite sides of the centerplane have a plurality of spaced apart and laterally extending wavy sipes 30 extending across the block element. Selective pairs of adjacent sipes (e.g. 32, 34) are interconnected by one or more circumferentially oriented notches 36.

The opposite lateral sides of the center tread region 14 are bounded respectively by the circumferential grooves 22, 24; the grooves representing the sole grooves within respective halves of the tire tread. Moreover, the notches 36 within the tire tread are confined to the center tread region 14.

The notches 36 and 46 always link two adjacent and parallel preferably wavy sipes. In order not to weaken the tread or render the tread too soft, the notches meet the sipes in non-recessed regions of the sipes. The notches further improve tread performance in providing improved side-rip in winter conditions and better comfort at dry handling.

It will further be noted from the foregoing that the tread has improved traction characteristics achieved through bounding one or more circumferential grooves by saw-tooth edges of opposing block elements. Each opposed block element provides a block edge facing the groove with the array of saw-teeth formed along each block edge inclined in the radial direction. Preferably, the saw-teeth on a groove-facing block edge of a center tread region block element(s) incline in a direction opposite from the inclination of saw-teeth on a groove-facing edge of a block element on the opposite second side of the groove. Preferably, the sipes extend across the center tread region block element to the array of saw-teeth along the groove-facing edge of the block element. The number of sipes preferably although not necessarily equal the number of saw-teeth along the block edge and align with respective saw-teeth spacing along the block edge. The block elements on opposite adjacent sides of the groove have saw-teeth inclining in opposite directions for improved gripping or traction.

The repeating circumferential array of first V-shaped grooves positioned on the centerplane and the repeating circumferential array of oppositely oriented second V-shaped grooves provided improved traction and gripping. The first V-grooves have a varying lengthwise depth that varies between about 2 and 7 millimeters from a shallower depth proximate to the vertex arm region to an increased depth at the medial arm region to a decreased depth at the terminal arm region. The width of the first V-groove arms further is varied from the vertex to the terminal ends and the varying depth and width of the first V-shaped groove arms from the vertex region to the terminal region make the containment volume of the groove arms per length unit constant.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle wheel tire comprising:
   a tire tread having a circumferential center tread region comprising at least a plurality of block elements arranged in a symmetric pattern on opposite sides of a tire circumferential equatorial centerplane, wherein symmetrically disposed block elements on opposite sides of the centerplane have a plurality of circumferentially spaced apart and laterally extending sipes extending across the block element and circumferentially oriented notches forming a mutually staggered circumferential array of notches, each notch being axially offset and staggered from circumferentially adjacent notches in the circumferential array, and each notch having opposite terminal ends intersecting and terminating at an adjacent respective pair of sipes, whereby the notch interconnects the respective adjacent pair of sipes; and
   wherein the pair of adjacent sipes each have a varying depth along the sipe, the varying depth having at least one recessed region and at least one non-recessed region along the sipe, and wherein the circumferentially oriented notches intersect at opposite ends the pair of adjacent sipes at respective non-recessed regions within each sipe; and wherein at each intersection of the notch and the sipe, a pair of bottom raising elements is provided in the sipe, the bottom raising elements defining a recess having substantially the same width as the width of the notch.

2. The tire of claim 1, wherein opposite lateral sides of the center tread region are bounded respectively by a circumferential groove.

3. The tire of claim 2, wherein each circumferential groove bounding the center tread region comprises a sole circumferential groove within a respective half of the tire tread.

4. The tire of claim 3, wherein the notches within the tire tread are confined to the center tread region.

5. The tire of claim 1, wherein the notches within the tire tread are confined to the center tread region.

6. The tire of claim 1, wherein the adjacent pair of interconnected sipes have at least partially a wavy configuration.

7. The tire of claim 1, wherein the notches within each of the block elements are substantially linear and mutually offset and linearly non-aligned in a circumferential direction.

8. The tire of claim 1, wherein each notch has a substantially rectangular sectional shape.

9. The tire of claim 8, wherein the recessed region of each sipe has a substantially semi-circular sectional shape.

\* \* \* \* \*